UNITED STATES PATENT OFFICE.

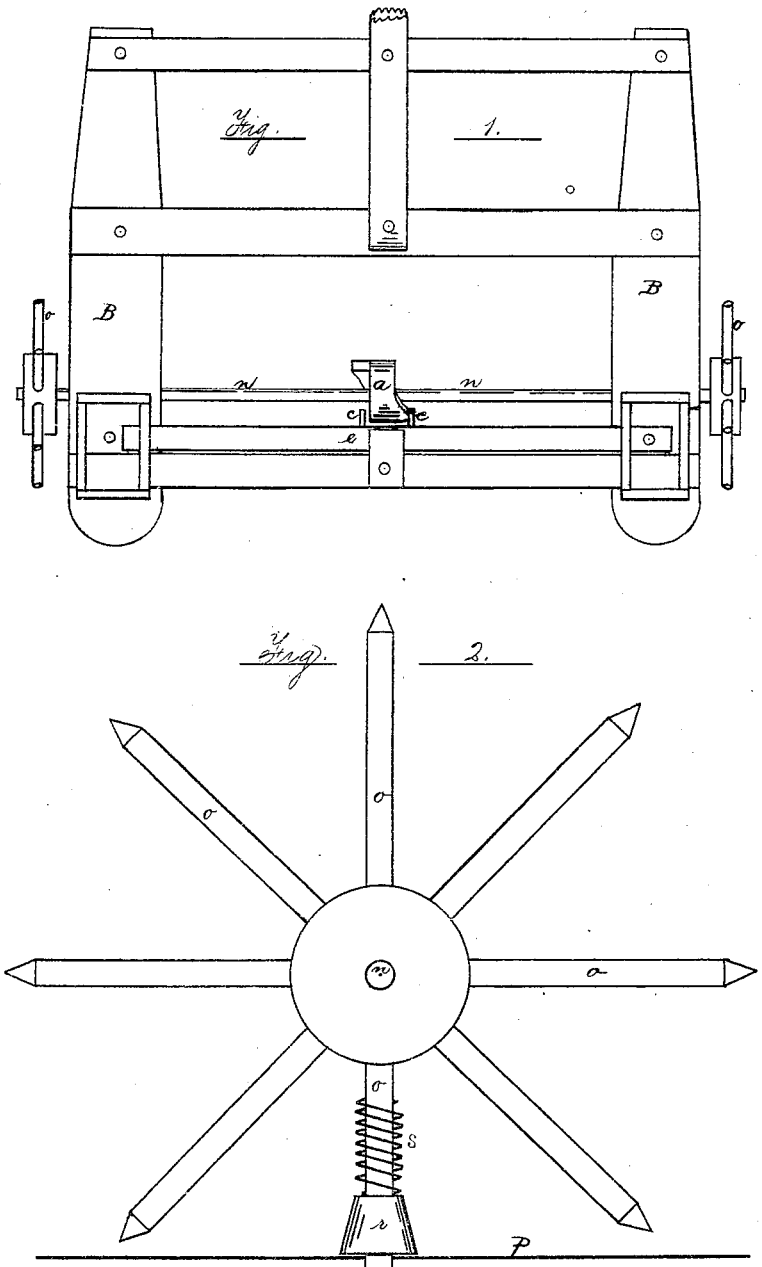

MILLIS KNICKERBOCKER, OF NEW LENOX, ILLINOIS.

IMPROVEMENT IN CORN-PLANTERS.

Specification forming part of Letters Patent No. 142,922, dated September 16, 1873; application filed November 1, 1872.

*To all whom it may concern:*

Be it known that I, MILLIS KNICKERBOCKER, of New Lenox, in Will county, and State of Illinois, have invented an Improvement in Land-Markers, of which the following is a specification:

My invention relates to a device to be attached to any corn or seed planter, by means of which the land where the seed is dropped may be marked in check-rows, and the seed-slide operated. In order to accomplish the desired effect I use wheels without rims, leaving simply the spokes $o$, upon which, and the shoe underneath, the machine travels over the ground. These spokes penetrate the earth, passing through clods, &c., so they cannot slide or roll over the same, which gives a steady motion to the machine, and measures the distance of the hills, where the grain is dropped, exactly by a spring-foot on the end of one of the spokes.

Figure 1 in the drawings is intended to show a plan view on the top of the device as it appears attached to a machine. Fig. 2 is a side view of one of the tireless spoke-wheels before mentioned.

Attached to one of the spokes $o$ is a block or foot, $r$, which slides up and down on the spoke as the same enters and comes out of the ground, the coil-spring $s$ pressing it out toward the end of the spoke.

The use of the block or foot $r$ is to mark the spot on the surface of the ground where the hills are planted, so the operator can determine whether the rows he is planting range in line with those previously planted; and, also, to enable the operator to set the wheel so it will start in line with the hills previously planted, by means of which it becomes unnecessary to mark the ground in any other manner, as the spokes $o$ will not allow the spaces between the hills to differ.

It is designed that this device may be attached to any kind of a corn-planter or seed-planter which operates in a similar manner.

P represents the ground-line, and shows the spoke $o$ run down into the ground, as when in operation.

Having thus described my invention, what I claim as new, and desire to secure by Letters Patent, is as follows:

The rimless wheels $o$, constructed, as shown and described, with the foot $r$ and spring $s$ on the end of one of the spokes, whereby the same may pass over obstructions without sliding so as to disturb the uniformity of the distance apart the seed is dropped, and mark the ground by means of the foot $r$, as and for the purpose set forth.

MILLIS KNICKERBOCKER.

Witnesses:
   THOS. H. HUTCHINS,
   E. J. ABELL.